United States Patent [19]
Servones

[11] Patent Number: 5,598,620
[45] Date of Patent: Feb. 4, 1997

[54] TOOL FOR ADJUSTING CAMBER

[75] Inventor: Pedro A. Servones, Mount Vernon, N.Y.

[73] Assignee: Lawrence I. Wechsler, Great Neck, N.Y.; a part interest

[21] Appl. No.: 388,198

[22] Filed: Feb. 13, 1995

[51] Int. Cl.⁶ .................................................. B25B 27/14
[52] U.S. Cl. .................................................. 29/273; 72/704
[58] Field of Search .............................. 72/704; 29/259, 29/273; 81/485; 280/661; 254/1, 231, 234

[56] References Cited

U.S. PATENT DOCUMENTS

| | | | |
|---|---|---|---|
| 2,764,215 | 9/1956 | Adams et al. | 72/704 |
| 2,778,401 | 1/1957 | Wilkerson | 72/704 |
| 4,255,865 | 3/1981 | Levene . | |
| 4,420,170 | 12/1983 | Wysocki | 280/661 |
| 5,024,001 | 6/1991 | Borner et al. . | |
| 5,080,388 | 1/1992 | Berry et al. . | |
| 5,111,586 | 5/1992 | Huynh . | |
| 5,168,632 | 12/1992 | Rimlinger, Jr. . | |
| 5,179,784 | 1/1993 | Kowis . | |
| 5,339,508 | 8/1994 | Ventress | 72/704 |

*Primary Examiner*—Lowell A. Larson
*Attorney, Agent, or Firm*—Lawrence I. Wechsler

[57] ABSTRACT

A tool for adjusting camber includes a body terminating at a forward end in a downwardly turned portion, and an advancing arm, slidingly mounted to the body, and forwardly extendable therefrom. The advancing arm may be advanced or retracted with respect to the body, for example, by rotation of a lead screw. A crank is disposed at an opposite end of the body from the downwardly turned end for rotating the lead screw. The leading edge of the advancing arm is designed to provide a stop against a part of the vehicle fixed with respect to the wheel, conveniently the strut. In operation, a level is attached to the center of the wheel to be adjusted, to indicate a desired setting. The downwardly turned portion of the body is hooked over the top of the wheel and the advancing arm is advanced until it is in engaged contact with the strut. Camber bolts holding the wheel in position are then loosened. The advancing arm is then advanced or retracted by turning the crank, until a desired camber reading is obtained, as indicated by the level. Camber bolts are re-tightened, and the camber adjustment tool and level removed from the wheel.

17 Claims, 4 Drawing Sheets

5,598,620

TOOL FOR ADJUSTING CAMBER

BACKGROUND OF THE INVENTION

The present invention relates to a tool for adjusting the camber of a vehicle's wheels and more particularly, a hand-held tool for simplifying the wheel camber adjustment of vehicles equipped with overhead struts.

The term camber refers to the alignment of the wheels relative to the vertical. Proper adjustment of camber is required to insure proper contact of the tire tread with the road surface. Positive camber refers to a condition in which the wheels are tilted outwardly at the tops thereof, and negative camber where the wheels are tilted inwardly. Improper camber will adversely affect the performance of a vehicle, resulting in uneven tire wear, and may be a source of a possible road hazard due to loss of traction.

In vehicles equipped with overhead struts, otherwise referred to as MacPherson struts, the wheels are maintained in the vertical position by a pair of bolts which extend through a pair of flanges affixed to a lower portion of the strut, which in turn surround a spindle attached to the wheel. When tightened, the bolts exert inward pressure upon the flanges, creating a friction union between the flanges and spindle, maintaining alignment by preventing movement of the tire.

Prior art adjustment of camber in such vehicles typically required at least two persons to perform the task. In the procedure, a level was attached to the center of the wheel being adjusted, to project horizontally outward. The level provided a means for indicating tilt of the wheel off the vertical, i.e. positive or negative camber. One person, positioned under the car would then loosen the camber bolts, while the other individual, positioned on the outwardly facing side of the wheel manually pulled the top of the tire outwardly or inwardly, until a desired camber reading was read from the level. He would then try to maintain the setting once established, while the person below the car re-tightened the bolts, to once again apply pressure on the friction surface.

Labor costs associated with the prior art procedure were increased by requiring the assistance of an extra mechanic. Furthermore, maintaining a proper camber setting by manually holding the wheel in place until the camber bolts were re-tightened was difficult and inexact.

OBJECTS AND SUMMARY OF THE INVENTION

Accordingly, it is an object of the invention to provide a tool for adjusting camber of a wheel, which overcomes the drawbacks of the prior art.

It is a further object of the invention to provide the tool for adjusting camber and a method of using the same which permits a single mechanic to perform the camber adjustment.

It is a still further object of the invention to provide the tool for adjusting camber which operates in a precise and reliable manner.

It is a still further object of the invention to provide the tool for adjusting camber which is compact and easy to use, and which may be produced economically.

Briefly stated, there is provided a tool for adjusting camber which includes a body, and an advancing arm slidingly mounted to the body, extendable from a forward end thereof. The body includes a downwardly turned portion at the forward end, adapted to hook over the top of a tire. Means are provided, preferably in the form of a lead screw, for advancing and retracting the advancing arm with respect to the body. A crank is disposed at an opposite end of the body from the downwardly turned end for rotating the lead screw. The free end of the advancing arm is designed to engage a vehicle stop, i.e. a part of the vehicle fixed with respect to the wheel, conveniently the strut. In the preferred case, the leading edge of the free end of the advancing arm is suitably shaped to engage, or receive the strut therein to prevent slippage of the tool during a camber adjustment.

To perform a camber adjustment using the tool according to the present invention, a level is attached to the center of the wheel to be adjusted, to indicate when the desired camber setting is achieved. The downwardly turned portion of the body is hooked over the top of the wheel, oriented with the concavely curved surface of downwardly turned portion in contact with the tread and the inwardly facing upper side of tire, and with the vehicle's strut in visual alignment with the free end of the advancing arm, sighted along the axis of advancement of the camber adjustment tool. The advancing arm is then advanced until it is in engaged contact with the strut. Camber bolts holding the wheel in position are then loosened, the wheel being prevented from sudden movement in a camber-negative direction by contact of the downwardly turned portion with the inner side of the tire and the advancing arm, which is stopped against the strut. The advancing arm is then advanced or retracted by turning the crank, causing the wheel to tilt about a camber axis which runs horizontally crosswise a rotation axis of the wheel, through the wheel's movable point of attachment to the strut. Advancement or retraction are continued until a desired camber reading is obtained, as indicated by the level. Because of the natural tendency of a vehicle's wheels to move inward at the tops thereof when the camber bolts are loosened, negative camber is achieved by retracting the advancing arm, which allows the top of the tire, held by the downwardly turned portion, to move closer to the strut. The downwardly turned portion hooked over the tire further allows the top of the tire to be urged outwardly against the natural wheel biasing, by advancement of the advancing arm which is stopped against the strut, to attain positive camber.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 7b is an operational side view of the camber adjustment tool of FIGS. 1–6, upon completion of adjustment of a front wheel of the automobile of FIG. 7a.

DETAILED DESCRIPTION OF THE PREFERRED EMBODIMENT

Figure 1:
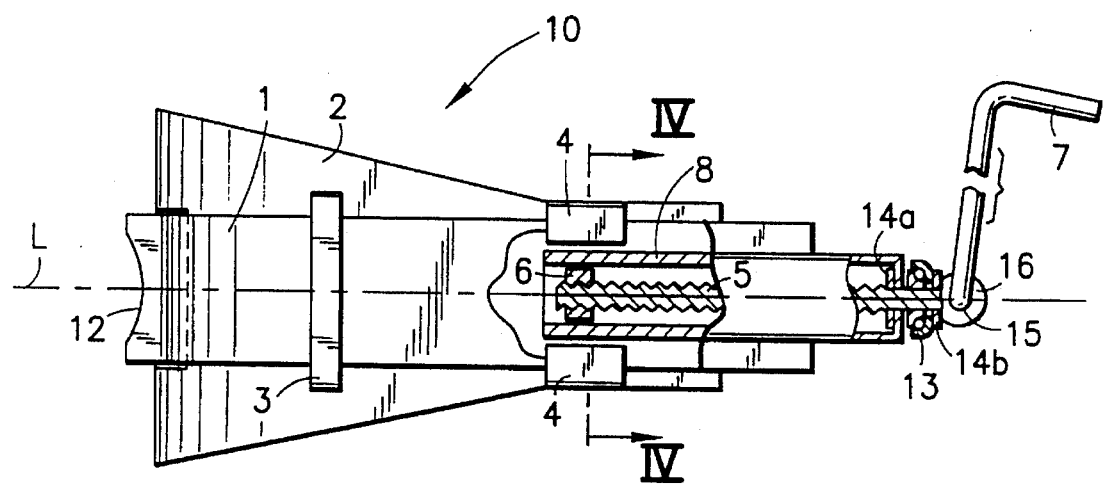
FIG. 1 is a top view in partial cross-section of the camber adjustment tool in accordance with the present invention.
Figure 2:
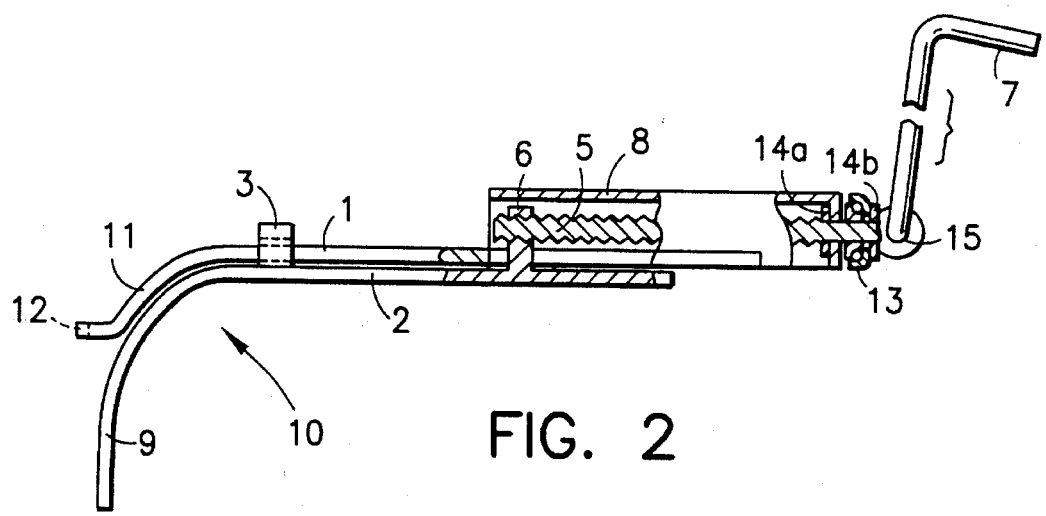
FIG. 2 is a side view in partial cross-section of the camber adjustment tool of FIG. 1.
Figure 3:
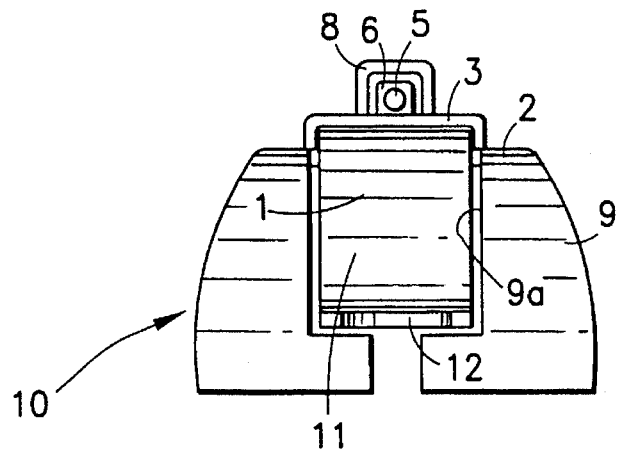
FIG. 3 is an end view of the camber adjustment tool of FIGS. 1 and 2.
Figure 4:
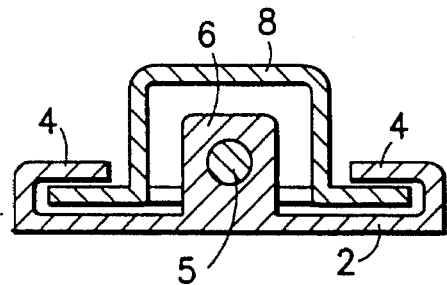
FIG. 4 is a cross-section taken on line IV—IV in FIG. 1.

Referring now to the figures, and in particular FIGS. 1–5, there is shown, generally at 10, a camber adjustment tool, in accordance with the invention. Camber adjustment tool 10 includes an advancing arm 1, slidably mounted to a body 2, to permit movement along an advancement axis L of camber adjustment tool 10. In the preferred case, a band 3 and flanges 4 attached to body 2, at spaced apart locations thereon, guide the slidable movement of advancing arm 1 with respect to body 2, and prevent separation thereof. Means are provided for advancing and retracting advancement arm 1 with respect body 2, preferably in the form of a lead screw 5 captively and pivotably connected to advancing arm 1, and threaded into a threaded receiver 6 attached to, or integral with, body 2. A crank 7 for turning lead screw 5 is provided at an end thereof. Threaded receiver 6 extends upward into a receiving channel 8 formed in advancing arm 1, to threadingly engage lead screw 5, as best seen in FIG. 4. Receiving channel 8 is open at the bottom a distance substantially the length of lead screw 5, to permit slidable movement of advancing arm 1 with respect to body 2, without the interference of threaded receiver 6. Means are provided for captively allowing pivoting of lead screw 5 without advancement thereof with respect to advancing arm 1, preferably in the form of a pair of retaining washers 14a and 14b disposed internal and external of receiving channel 8, respectively. An external bearing 13 disposed between an end of receiving channel 8 and retaining washer 14b optionally provides smoother operation of camber adjustment tool 10, by preventing binding of the screw/crank mechanism when pressure is applied to advancing arm 1. A crank hole 15 through a screw extension end portion 16 having an axis running crosswise advancement axis L of camber adjustment tool 10 pivotably receives an end of crank 7, allowing crank 7 to be appropriately oriented for cranking when in use, and folded against body for more compact storage.

Means are carried on a forward end of body 2 for engagedly contacting an inner facing surface of a tire, for example, an extension part in the form of a downwardly turned end 9. Downwardly turned end 9 is suitably shaped to conform to the radial curve of the tire, to permit body 2 to be hooked over and rest atop a tire. In the preferred case, advancing arm 1 also turns downwardly at a free end 11 to assure transfer of forces as closely as possible along a common plane during camber adjustment and to insure contact of advancing arm 101 at an appropriate height on a strut, the steps of which will be described below. A cutout 9a (best seen in FIG. 3) is dimensioned to receive free end 11 therein when advancing arm 1 is fully retracted. This feature minimizes the distance between the downwardly curved end 9 of body 2 and the leading edge of free end 11, insuring that camber adjustment tool 10 will fit between the wheel and the strut. This is especially relevant in situations involving extreme negative camber or where original equipment wheels have been replaced with custom wheels that are wider than the originals, thereby reducing the available room between the inside of the wheel and the strut.

Figure 6:
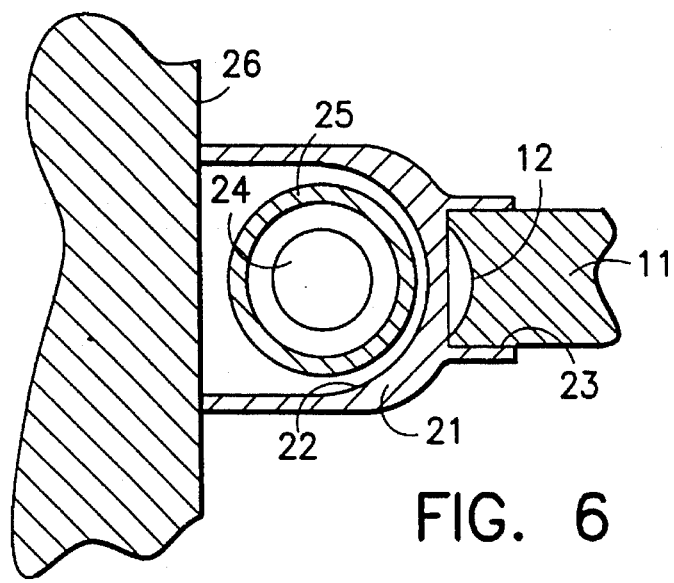
FIG. 6 is a cross-sectional top view of an end adapter for use with the camber adjustment tool according to the present invention, shown in use with regard to a rear strut and air bag.

Means for engaging a fixed part of the car, for example an overhead strut, are provided at free end 11, conveniently in the form of a concave stop 12, the curvature of which appropriately conforms to the diameter of the strut. Alternatively, free end 11 may be adapted to strike up against the fire wail of the vehicle or other surface which provides a stop against movement of the tire with respect thereto, rather than against a strut, for example in adjusting rear wheels of vehicles equipped with rear overhead struts, for which the present invention will find utility in addition to the adjustment of front wheels. Many rear struts include an air bag which surrounds the strut, which would otherwise interfere with, and possibly be punctured by, a concave stop 12 having a receiving radius suited for a front strut, and intended to provide a stop in contact with the strut itself. Referring now to FIG. 6, an embodiment is illustrated which addresses the need to modify the structure of concave stop 12 for use with a strut surrounded by an air bag. An end adapter 21 receives free end 11 of advancing arm 1 within an interference fit receiving channel 23. End adapter 21 includes a curved clearance stop 22 for clearing a strut 24 and bag 25, and for instead stopping against a vertical wall of car body 26, fixed with respect to a rear wheel of the vehicle, i.e. typically the inside wheel well, as shown.

Although adapter 21 shown in FIG. 6 is specifically designed to permit adjustment of a rear wheel by allowing free end 11 to bottom against car body 26, similarly constructed end adapters having equivalent structure may alternatively be provided for engaging the strut itself, for use with vehicles equipped with struts having a radius larger or smaller than concave stop 12. In this case, the adapter would be provided with a concave end matching the radius of the particular strut, for reception therein. Additionally, another end adapter could further be fashioned to extend the advancing distance of advancing arm 1, for use with vehicles presenting greater distance between the wheel and the strut, permitting one size camber adjustment tool 10 to be used to align a wide range of vehicles.

Figure 7A:
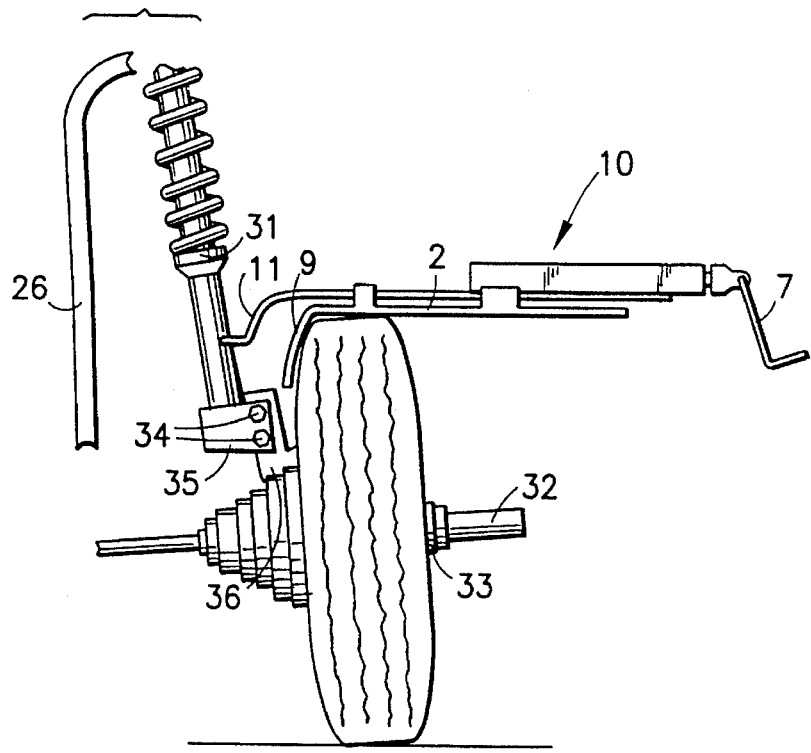
FIG. 7a is an operational side view of the camber adjustment tool of FIGS. 1–6, prior to adjustment of a front wheel in a position of negative camber, of an automobile equipped with overhead struts.
Figure 7B:
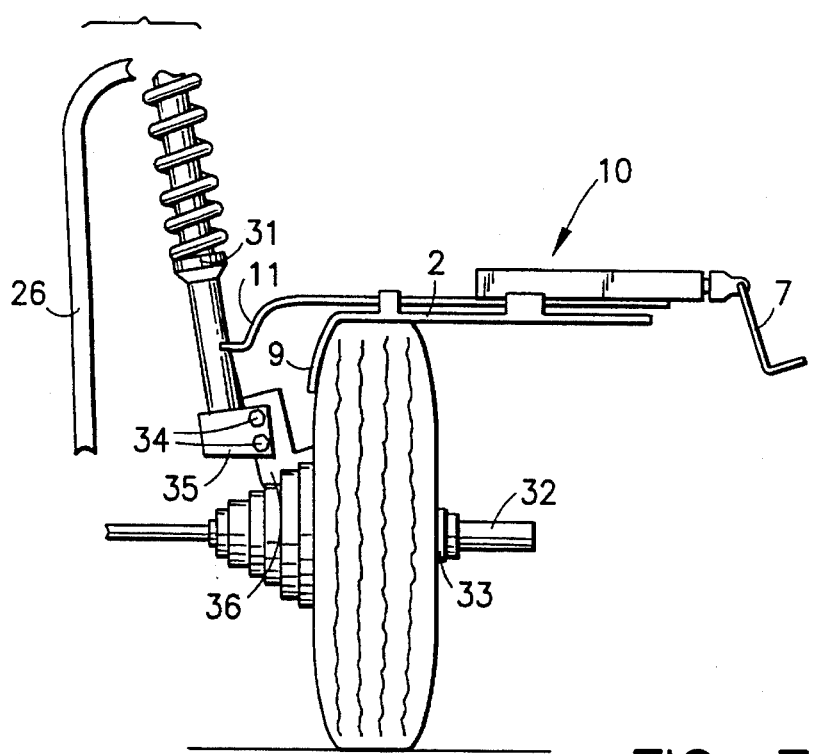
Figure 5:
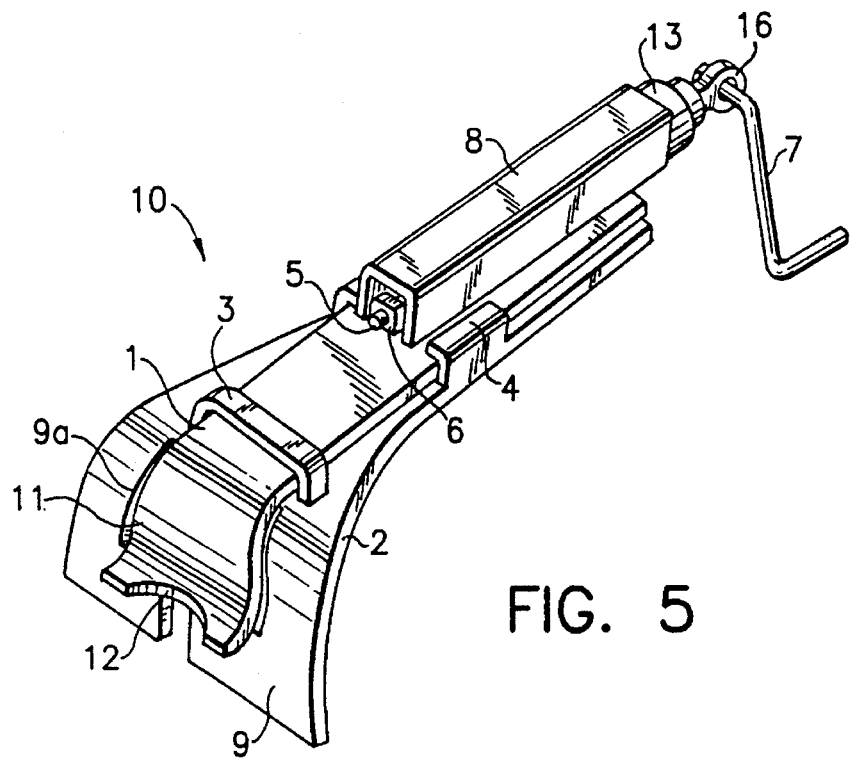
FIG. 5 is a perspective view of the camber adjustment tool of FIGS. 1–4.

Operation of camber adjustment tool 10 in performing a camber adjustment of a front wheel of an automobile equipped with overhead struts, will now be described with reference to FIGS. 7a and 7b, illustrating schematically a wheel prior to, and after alignment, respectively. Referring first to FIG. 7a, a wheel 30 is shown prior to camber adjustment, and depicts a condition of negative camber. The degree of tilt of wheel 30 has been exaggerated for illustration purposes. To perform a camber adjustment in accordance with the present invention, camber adjustment tool 10 is positioned with downwardly turned end 9 of body 2 hooked over the top of wheel 30. Camber adjustment tool 10 is initially in a fully retracted position, with free end 11 of advancing arm 1 approximated as closely as possible to downwardly turned end 9 of body 2, to permit clearance of camber adjustment tool 10 between wheel 30 and strut 31. Camber adjustment tool 10 is properly positioned with free end 11 of the advancing arm in visual alignment with strut 31, sighted along advancement axis L. Crank 7 is then rotated clockwise (in the case of a right-handed lead screw 5) to extend advancing arm 1 in a direction towards engagement with strut 31. When advancing arm 1 contacts strut 31 which is received within concave stop 12, the turning of crank 7 is terminated. A wheel level 32 is attached in typical fashion to the central axis of a hub 33 of wheel 30, to indicate when a desired camber setting is attained. A pair of camber bolts 34, which, when tightened, exert compression pressure against an opposed pair of flanges 35 connected to strut 31 between which a spindle 36 is interposed, maintain the camber positioning of wheel 30 during normal operation. To adjust camber, camber bolts 34 must be loosened to permit movement of spindle 36 between flanges 35, and in turn permit vertical tilting movement of wheel 30 about a camber axis which runs through its point of attachment to strut 31, and which extends in a direction crosswise a rotation axis of wheel 30. Concave stop 12, in contact with strut 31, supports camber adjustment tool 10 and prevents sudden movement of wheel 30 to a position of negative camber which would otherwise occur if wheel 30 were unsupported, and wheel 30 not already in a full negative camber position. Referring now to FIG. 7b, once camber bolts 34 are loosened, crank 7 is rotated clockwise, to further extend advancing arm 1 with respect to downwardly turned end 9 of body 2. Concave stop 12, in contact with strut 31, provides a stop against forward movement of advancing arm 1 with respect to the vehicle. Consequently, the extension of advancing arm I causes downwardly turned end 9 of body 2 in hooked position over wheel 30 to exert pressure on the inwardly facing upper surface of wheel 30, urging wheel 30 in a camber-positive direction, against a natural tendency to return to a position of negative camber. Rotating of crank 7 is continued until a desired reading of level 32 is attained. If a desired position is passed by overturning of crank 7 in a clockwise direction, resulting in a condition of excessive positive camber, advancing arm is retracted by rotation of crank 7 counterclockwise, allowing the top of wheel 30 to tilt back towards strut 31, the movement initiated by the natural tendency of wheel 30 to move in a camber-negative direction. When a desired setting is attained, as indicated by level 32, camber bolts 34 are re-tightened to maintain the position of wheel 30. Crank 7 is then rotated in a counter-clockwise direction to clear strut 11, and camber adjustment tool 10 removed, along with level 32.

Although the present example illustrated in FIGS. 7a and 7b is directed to an initial condition of negative camber, a wheel initially exhibiting positive camber may be similarly adjusted to vertical. The steps are followed exactly as those set forth in the above example prior to loosening camber bolts 34. Once loosened, however, crank 7 is rotated in a counterclockwise direction (assuming a fight handed lead screw 5), retracting advancing arm 1 which allows the naturally camber-negatively biased top of wheel 30 to tilt inwardly in a camber-negative direction.

The thread dimensions of lead screw 5, (not shown in FIG. 7a or 7b) are appropriately selected to assure adequate performance. In particular, threads are preferably sufficient in number per inch to prevent uninitiated rotational movement thereof upon application of force in the direction of linear displacement. As a result, a camber setting will be maintained during adjustment notwithstanding the natural biasing force which tends to move the top of wheel 30 inwardly when camber bolts 34 are in a loosened condition, even when crank 7 is not being held in the hand. This feature is important in permitting one-man operation of camber adjustment tool 10. On the other hand, while observing the above criterion, the threads per inch of lead screw 5 should be sufficiently coarse to optimize the amount of linear displacement for each rotation of the crank, to provide efficient operation. Experiments have shown, for example, that an Acme or similar "translating screw" having a ½ inch diameter and 10 threads per inch performs satisfactorily.

Figure 8:
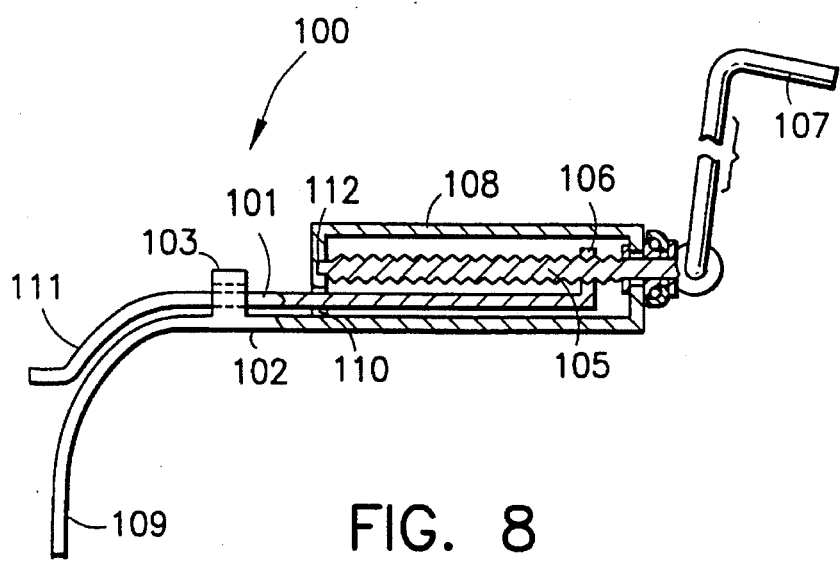
FIG. 8 is a side view in partial cross-section of an alternate embodiment of the camber adjustment tool in accordance with the present invention.

In the above described embodiment, lead screw 5 is captively and pivotably connected to advancing arm 1, and threaded into threaded receiver 6 carried on body 2. Crank 7 is further provided for turning lead screw 5. With this arrangement, the crank and the lead screw move in the advancement direction, following advancing arm 1 during extension. An alternate structure may be provided that permits the movement of advancement arm 1 without linear advancement of crank 7. Referring now to FIG. 8, there is shown, generally at 100, an alternate embodiment of a camber adjustment tool in accordance with the invention.

Camber adjustment tool 100 includes an advancing arm 101, slidably mounted to a body 102, to permit linear movement therebetween, as with the previously described embodiment. A band 103 attached to body 102, at a forward location thereon, guides the slidable movement of advancing arm 101 with respect to body 102, and prevents separation thereof. A downwardly turned end 109, suitably shaped to conform to the radial curve of the tire, permits body 102 to be hooked over and rest atop a tire, providing means for contacting the top inner side of a tire during adjustment of wheel camber. In the illustrated example of FIG. 8, advancing arm 101 also turns downwardly at a free end 111 to assure transfer of forces as closely as possible along a common horizontal plane during camber adjustment, and to insure contact of advancing arm 101 at an appropriate position on a strut. A lead screw 105 is captively and pivotably connected to body 102 by means which allow pivoting of lead screw 105 without advancement thereof with respect to body 2, in an equivalent manner to that described in the previous embodiment with respect to the connection of lead screw 5 to advancement arm 1. A threaded receiver 106 attached to, or integral with, advancing arm 101 is provided for threadingly receiving lead screw 105 therethrough. The placement of threaded receiver 106 at a rearward end of advancing arm 101 additionally provides guide support in conjunction with band 103. Threaded receiver 106 extends upward into a receiving channel 108 formed on body 102. Lead screw 105 is pivotably supported at a forward end by a pivot seat 112 formed in receiving channel 108. Receiving channel 108 encloses lead screw 105 and threaded receiver 106 to prevent accumulation of dirt and the like which might adversely affect operation. A clearance slot 110 formed through the forward face of receiving channel slidingly receives advancing arm 101 therethrough, permitting free motion of advancing arm 101 with respect to body 102 in the linear advancement direction.

Where lead screw 105 is a right handed thread, clockwise rotation of crank 107 retracts advancing arm 101 and counterclockwise rotation extends it, i.e. in a manner opposite that of the previous embodiment, in which respective placement of the lead screw and the threaded receiver on the advancing arm and the body are reversed. Where it is desired to extend advancing arm 101 with respect to body 102 by clockwise cranking motion, a left handed thread may be used for lead screw 105.

The embodiment of FIG. 8 permits a more compact shape of camber adjustment tool 100 by allowing advancing arm 101 to retract into receiving channel 108. Further, by pivotably connecting lead screw 105 to body 102, the distance between the wheel being adjusted and crank 107 remains constant while advancing and retracting advancement arm 101.

It is further noted, that although a screw mechanism has been selected for purposes of disclosure relating to the means for advancing and retracting the advancement arm, it is to be understood that other mechanisms suitable for such purposes may be used in its place.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A tool for adjusting camber of a wheel on a vehicle, comprising:

a body receivable on top of the wheel and having an extension part receivable against a side of the wheel facing inwardly of the vehicle, on a portion thereof disposed above a camber axis of the wheel, the tool further including;

an advancing arm movably mounted to said body, said advancing arm being extendable in a first direction to engage a stop on the vehicle remote from said side of wheel; and means for extending said advancing arm in said first direction, a continued operation of said extending means following engagement of said advancing arm with said vehicle stop being operable to retract said body in a second direction opposite to said first direction whereby a resultant force in said second direction exerted on said portion of said side disposed above said camber axis by the body extension piece pivots the wheel about said camber axis.

2. The tool for adjusting camber according to claim 1, wherein said means for extending includes a lead screw pivotably carried on one of said advancing arm and said body, and a threaded receiving means carried on a remaining one.

3. The tool for adjusting camber according to claim 1, wherein said extension part is a downwardly turned portion carded on a forward end of said body.

4. The tool for adjusting camber according to claim 1, wherein:

said vehicle stop includes at least a portion of a strut; and said advancing arm includes a concave stop formed in a forward end thereof for receiving said strut therein.

5. The tool for adjusting camber according to claim 4, wherein said concave stop and said means for engaging are arranged substantially along a common plane.

6. The tool for adjusting camber according to claim 1, wherein said advancing arm and said body are substantially aligned along a common advancement axis.

7. The tool for adjusting camber according to claim 1, further comprising an adapter receivable on said advancing arm.

8. A tool for adjusting camber of a wheel on a vehicle, comprising:

a body;

said body including means for engaging the wheel above a camber axis thereof, on a side of the wheel facing a stop on said vehicle remote from said wheel;

an advancing arm movably mounted to said body, said advancing arm being extendable in a first direction to engage said vehicle stop;

means for extending said advancing arm in said first direction, a continued operation of said extending means following engagement of said advancing arm with said vehicle stop being operable to retract said body in a second direction opposite said first direction against a negative-camber wheel biasing, said means for engaging transferring a resultant counter-force in said second direction to said side of the wheel disposed above said camber axis, whereby the wheel pivots about said camber axis in a camber-positive direction; and means for retracting said advancing arm, operation of said means for retracting being operable to advance said body in said first direction during engagement of said advancing arm with said vehicle stop, said means for engaging retaining the wheel against said negative-camber wheel biasing by engagement thereof with said side of the wheel disposed above said camber axis, whereby the wheel pivots about said camber axis in a camber-negative direction, an amount controlled by said operation of said means for retracting.

9. The tool for adjusting camber according to claim 8, further comprising:

means for retaining a relative positioning of said advancing arm and said body during operation of said means for extending and said means for retracting.

10. The tool for adjusting camber according to claim 8, wherein said means for extending and said means for retracting includes a lead screw pivotably carded on one of said advancing arm and said body, and a threaded receiving means carried on a remaining one.

11. The tool for adjusting camber according to claim 8, wherein said extension part means is a downwardly turned portion carried on a forward end of said body.

12. The tool for adjusting camber according to claim 8, wherein:

said advancing arm includes a concave stop formed in a forward end thereof for receiving a strut therein.

13. The tool for adjusting camber according to claim 12, wherein said concave stop and said means for engaging are arranged substantially along a common plane.

14. The tool for adjusting camber according to claim 8, wherein said advancing arm and said body are substantially aligned along a common advancement axis.

15. The tool for adjusting camber according to claim 8, further comprising an adapter receivable on said advancing arm.

16. A tool for adjusting camber of a wheel on a vehicle having an overhead strut, comprising:

a body receivable on top of the wheel and having an extension part receivable against a side of the wheel, the tool further including;

an advancing arm slidably carried on the body, said advancing arm being extendable in a first direction to engage a stop on the vehicle remote from said side of wheel;

means for extending said advancing arm in said first direction, a continued operation of said extending means following engagement of said advancing arm with said vehicle stop being operable to retract said body in a second direction opposite to said first direction whereby the body extension piece pivots the wheel about a camber axis; and said body including a cutout for receiving a forward end of said advancing arm therein when said advancing arm is retracted.

17. A tool for adjusting camber of a wheel on a vehicle having an overhead strut, comprising:

a body;

said body including means for engaging a side of the wheel facing opposite the strut said means for engaging being positionable above a camber axis of said wheel;

an advancing arm slidably mounted to the body, said advancing arm being extendable in a first direction to engage a stop on the vehicle;

means for extending said advancing arm in said first direction, a continued operation of said extending means following engagement of said advancing arm with said vehicle stop being operable to retract said body in a second direction opposite said first direction against a negative-camber wheel biasing, whereby said means for engaging pivots the wheel about a camber axis in a camber-positive direction;

means for retracting said advancing arm, operation of said means for retracting being operable to advance said body in said first direction during engagement of said advancing arm with said vehicle stop, said means for engaging retaining said wheel against said negative-camber wheel biasing, whereby said wheel pivots about a camber axis in a camber-negative direction, an amount controlled by said operation of said means for retracting; and said body including a cutout for receiving a forward end of said advancing arm therein when said advancing arm is retracted.

* * * * *